US007468126B2

(12) United States Patent
Zones et al.

(10) Patent No.: US 7,468,126 B2
(45) Date of Patent: Dec. 23, 2008

(54) PREPARING SMALL CRYSTAL SSZ-32 AND ITS USE IN A HYDROCARBON CONVERSION PROCESS

(75) Inventors: Stacey I. Zones, San Francisco, CA (US); Guang Zhang, Walnut Creek, CA (US); Kamala Krishna, Danville, CA (US); Joseph A. Biscardi, Berkeley, CA (US); Paul Marcantonio, Galeta, CA (US); Euthimios Vittoratos, Richmond, CA (US)

(73) Assignee: Chevron U.S.A., Inc., San Ramon, CA (US)

( * ) Notice: Subject to any disclaimer, the term of this patent is extended or adjusted under 35 U.S.C. 154(b) by 204 days.

(21) Appl. No.: 11/467,093

(22) Filed: Aug. 24, 2006

(65) Prior Publication Data

US 2007/0041898 A1  Feb. 22, 2007

Related U.S. Application Data

(62) Division of application No. 10/698,250, filed on Oct. 31, 2003, now Pat. No. 7,390,763.

(51) Int. Cl.
*C10G 45/64* (2006.01)
*B01J 29/06* (2006.01)

(52) U.S. Cl. .............. 208/26; 502/62; 502/85; 502/243; 502/250; 502/251; 502/263; 423/706

(58) Field of Classification Search .......... 208/26; 423/706; 502/62, 85, 243, 250, 251, 263
See application file for complete search history.

(56) References Cited

U.S. PATENT DOCUMENTS

| | | | |
|---|---|---|---|
| 3,140,249 A | 7/1964 | Plank et al. | |
| 3,140,251 A | 7/1964 | Plank et al. | |
| 3,140,253 A | 7/1964 | Plank et al. | |
| 3,852,207 A | 12/1974 | Stangeland et al. | |
| 4,094,821 A | 6/1978 | McVicker et al. | |
| 4,481,177 A | 11/1984 | Valyocsik | |
| 4,483,835 A | 11/1984 | Zones | |
| 4,503,024 A | 3/1985 | Bourgogne et al. | |
| 5,053,373 A | 10/1991 | Zones | |
| 5,252,527 A | 10/1993 | Zones | |
| 5,282,958 A | 2/1994 | Santilli et al. | |
| 5,300,210 A | 4/1994 | Zones et al. | |
| 5,397,454 A * | 3/1995 | Zones et al. | 208/46 |
| 5,558,851 A * | 9/1996 | Miller | 423/702 |

(Continued)

OTHER PUBLICATIONS

P. A. Wright, J. M. Thomas, G. R. Millward, S. Ramdas, and S. A. Barri, ZSM-23: A Suggested Structure, J. Chem. Soc. Chem. Comm. 1985, pp. 1117-1119.

(Continued)

*Primary Examiner*—David M Brunsman
(74) *Attorney, Agent, or Firm*—Penny L. Prater

(57) ABSTRACT

The invention is directed to a method of making a small crystal SSZ-32 zeolite, known as SSZ-32X. The catalyst is suitable for use in a process whereby a feed including straight chain and slightly branched paraffins having 10 or more carbon atoms is dewaxed to produce an isomerized product, with increased yield of isomerized material and decreased production of light ends.

20 Claims, 4 Drawing Sheets

U.S. PATENT DOCUMENTS 5,707,601 A    1/1998  Nakagawa
5,785,947 A    7/1998  Zones et al.
6,663,768 B1 * 12/2003 Miller .......................... 208/27
7,074,320 B2 * 7/2006  Miller .......................... 208/27

OTHER PUBLICATIONS

P. A. Jacobs and J. A. Martens, Exploration of the Void Size and Structure of Zeolites and Molecular Sieves Using Chemical Reactions, Proc. of 7th Intl. Zeolite Conf. Tokyo, 1986 pp. 23-32.

* cited by examiner

PREPARING SMALL CRYSTAL SSZ-32 AND ITS USE IN A HYDROCARBON CONVERSION PROCESS

This application is a Divisional U.S. application Ser. No. 10/698,250 filed Oct. 31, 2003, now U.S. Pat. No. 7,390,763, and claims priority therefrom.

FIELD OF THE INVENTION

This invention is directed to a method of making a catalyst comprising a small crystal intermediate pore size zeolite, specifically SSZ-32. The catalyst is suitable for use in isomerizing a feed which includes straight chain and slightly branched paraffins having 10 or more carbon atoms.

BACKGROUND OF THE INVENTION

The production of Group II and Group III base oils employing hydroprocessing has become increasing popular in recent years. Catalysts that demonstrate improved isomerization selectivity and conversion are continually sought. As discussed in U.S. Pat. No. 5,282,958, col. 1-2, the use of intermediate pore molecular sieves such as ZSM-22, ZSM-23, ZSM-35, SSZ-32, SAPO-11, SAPO-31, SM-3, SM-6 in isomerization and shape-selective dewaxing is well-known. Other typical zeolites useful in dewaxing include ZSM-48, ZSM-57, SSZ-20, EU-I, EU-13, Ferrierite, SUZ-4, theta-1, NU-10, NU-23, NU-87, ISI-1, ISI-4, KZ-1, and KZ-2.

U.S. Pat. No. 5,252,527 and 5,053,373 disclose a zeolite such as SSZ-32 which is prepared using an N-lower alkyl-N'-isopropyl-imidazolium cation as a template. U.S. Pat. No. 5,053,373 discloses a silica to alumina ratio of greater than 20 to less than 40 and a constraint index, after calcination and in the hydrogen form of 13 or greater. The zeolite of U.S. Pat. No. 5,252,527 is not restricted to a constraint index of 13 or greater. U.S. Pat. No. 5,252,527 discloses loading zeolites with metals in order to provide a hydrogenation dehydrogenation function. Typical replacing cations can include hydrogen ammonium, metal cations, e.g., rare earth, Group IIA and Group VII metals, as well as their mixtures. A method for preparation of MTT-type zeolites such as SSZ-32 or ZSM-23 using small neutral amines is disclosed in U.S. Pat. No. 5,707,601.

U.S. Pat. No. 5,397,454 discloses hydroconversion processes employing a zeolite such as SSZ-32 which has a small crystallite size and a constraint index of 13 or greater, after calcinations and in the hydrogen form. The catalyst possesses a silica to alumina ratio of greater than 20 and less than 40. U.S. Pat. No. 5,300,210 is also directed to hydrocarbon conversion processes employing SSZ-32. The SSZ-32 of U.S. Pat. No. 5,300,210 is not limited to a small crystal size.

SUMMARY OF THE INVENTION

The instant invention is directed to a small crystal SSZ-32 zeolite (hereinafter referred to as SSZ-32X) which is suitable for dewaxing a hydrocarbon feed to produce an isomerized product. It is also directed to a method of making this zeolite, and to dewaxing processes employing catalyst comprising SSZ-32X. The feed to the process includes straight chain and slightly branched paraffins having 10 or more carbon atoms. The feed is contacted under isomerization conditions in the presence of hydrogen with a catalyst comprising an SSZ-32X. This catalyst possesses, in comparison with standard SSZ-32, less defined crystallinity, altered Argon adsorption ratios, increased external surface area and reduced cracking activity over other intermediated pore size molecular sieves used for isomerization. Use of this catalyst in isomerization results in a higher lube product yield and lower gas production.

DETAILED DESCRIPTION OF THE PREFERRED EMBODIMENT

Catalyst Preparation

Figure 1A:
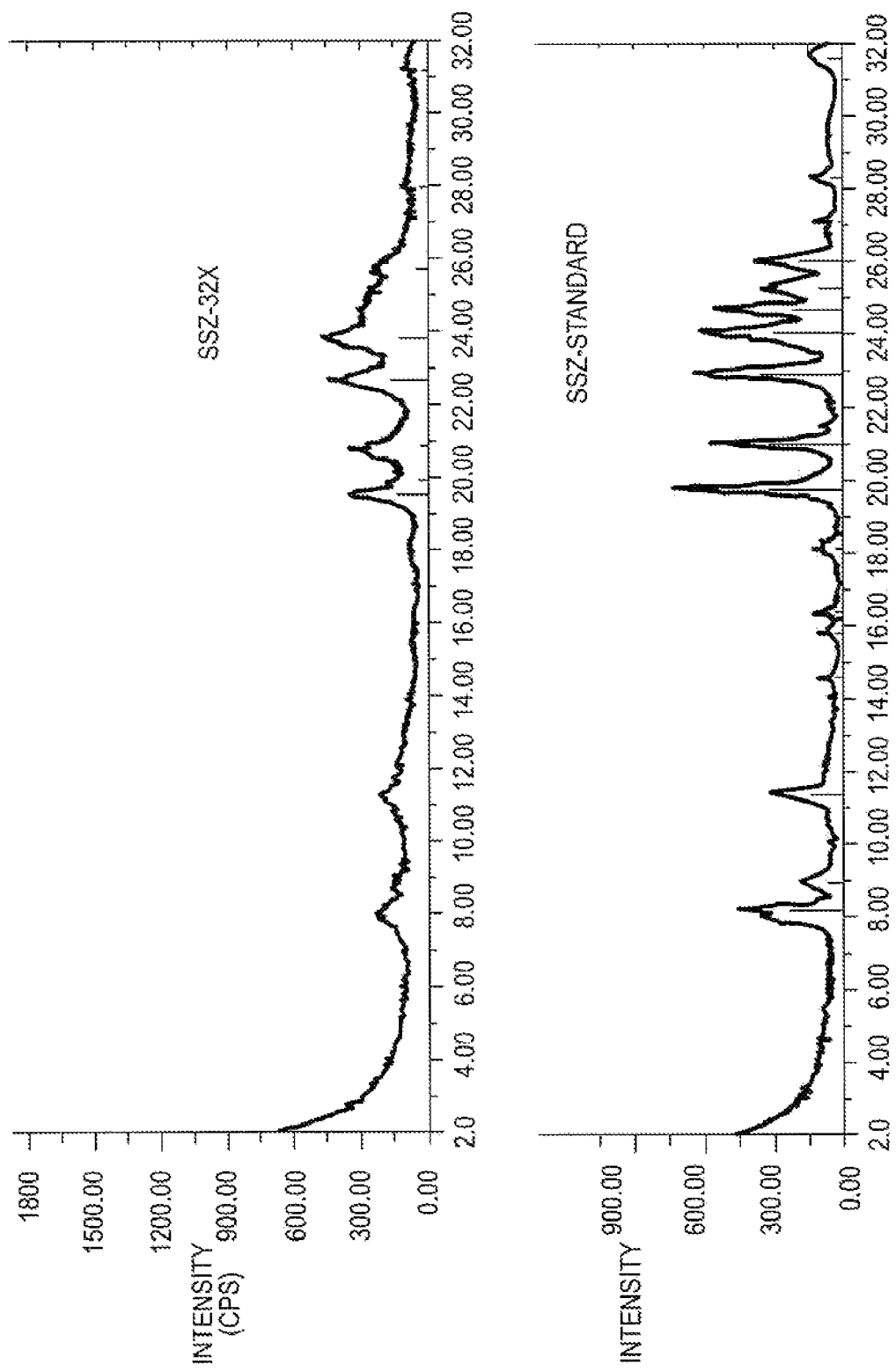
FIGS. 1(a), 1(b) and 1(c) illustrate comparisons between the x-ray diffraction patterns of standard SSZ-32 and SSZ-32X.

Novel SSZ-32 zeolites can be suitably prepared from an aqueous solution containing sources of an alkali metal oxide or hydroxide an alkylamine (such as isobutylamine) an N-lower alkyl-N'-isopropyl-imidazolium cation (preferably N,N'-diisopropyl-imidazolium cation or N-methyl-N'-isopropyl-imidazolium cation) which is subsequently ion-exchanged to the hydroxide form, an oxide of aluminum (preferably wherein the aluminum oxide source provides aluminum oxide which is covalently dispersed on silica), and an additional oxide of silicon. The reaction mixture should have a composition in terms of mole ratios falling within the following ranges:

TABLE 1

| Composition of mole ratios | | |
|---|---|---|
| | Broad | Preferred |
| $SiO_2/Al_2O_3$ | 20-less than 40 | 30-35 |
| $OH-/SiO_2$ | 0.10-1.0 | 0.20-0.40 |
| $Q/SiO_2$ | 0.05-0.50 | 0.10-0.25 |
| $M+/SiO_2$ | 0.05-0.30 | 0.15-0.30 |
| $H_2O/SiO_2$ | 20-300 | 25-60 |
| $Q/Q+M+$ | 0.25-0.75 | 0.33-0.67 | wherein Q is the sum of $Q_a$ and $Q_b$ $Q_a$ is an N-lower alkyl-N'-isopropyl-imidazolium cation (preferably an N,N'-diisopropyl-imidazolium cation or N-methyl-N'-isopropyl-imidazolium cation). $Q_b$ is an amine. Isobutyl, neopentyl or monoethyl amine are suitable examples of $Q_b$, although other amines may be used. The molar concentration of amine, $Q_b$ must be greater than the molar concentration of the imidazolium compound, $Q_a$. Generally the molar concentration of $Q_b$ is in the range from 2 to about nine times the molar concentration of Qa. U.S. Pat. No. 5,785,947 (herein incorporated by reference) describes how a zeolite synthesis method employing two organic sources, one source being an amine containing from one to eight carbons provides significant cost savings over a method in which the quaternary ammonium ion source (such as imidazolium) is the only source of organic component. The combination of the 2 organic nitrogen sources allows the possibility of the primary template (used in smaller quantity) to nucleate the desired zeolite structure and then the amine to contribute to filling the pores in a stabilizing manner, during crystal growth. Empty pores of high silica zeolites are susceptible to re-dissolution under the synthesis conditions. The amine also can contribute to maintaining an elevated alkalinity for the synthesis.

M is an alkali metal ion, preferably sodium or potassium. The organic cation compound which acts as a source of the quaternary ammonium ion employed can provide hydroxide ion.

The cation component $Q_a$, of the crystallization mixture is preferably derived from a compound of the formula

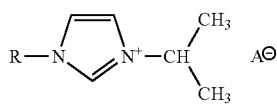

wherein R is lower alkyl containing 1 to 5 carbon atoms and preferably —CH3 or isopropyl and an anion (Aθ) which is not detrimental to the formation of the zeolite. Representative of the anions include halogens, e.g., fluoride, chloride, bromide and iodide, hydroxides, acetate, sulfate, carboxylate, etc. Hydroxide is the most preferred anion.

The reaction mixture is prepared using standard zeolitic preparation techniques. Typical sources of aluminum oxide for the reaction mixture include aluminates, alumina, and aluminum compounds, such as aluminum-coated silica colloids (preferably Nalco 1056 colloid sol although other brands may be used) $Al_2(SO_4)_3$, and other zeolites, In a preferred method of preparing zeolite SSZ-32X, we have found that providing sources of aluminum oxide to a zeolite synthesis mixture wherein the aluminum oxide is in a covalently dispersed form on silica allows zeolites with increased aluminum content to be crystallized. Increased alumina content promotes isomerization. In another approach zeolites of pentasil structure and lower silica/alumina ratios (approximately 10) can be used as aluminum oxide sources or feedstocks for the synthesis of zeolite SSZ-32X. These zeolites are recrystallized to the new SSZ-32X zeolite in the presence of the organic sources $Q_a$ and $Q_b$ described above.

Mordenite and ferrierite zeolites constitute two such useful sources of aluminum oxide or feedstocks. These latter zeolites have also been used in the crystallization of ZSM-5 and ZSM-11 (U.S. Pat. No. 4,503,024).

In another preferred approach, wherein the aluminum oxide is in a covalently dispersed form on silica is to use an alumina coated silica sol such as that manufactured by Nalco Chem. Co. under the product name 1056 colloid sol(26% silica, 4% alumina). In addition to providing novel SSZ-32 X with high aluminum content, use of the sol generates crystallites of less than 1000 A (along the principal axis) with surprisingly high isomerization capability.

Indeed, the catalytic performance of SSZ-32X (in the hydrogen form) for cracking capability is manifested by Constraint Index values (as defined in J. Catalysis 67, page 218) of 13 or greater and preferably from 13 to 22. Determination of Constraint index is also disclosed in U.S. Pat. No. 4,481,177. In general, lowering the crystallite size of a zeolite leads to decreased shape selectivity. This has been demonstrated for ZSM-5 reactions involving aromatics as shown in J. Catalysis 99,327 (1986). In addition, a zeolite ZSM-22, (U.S. Pat. No. 4,481,177) has been found to be closely related to ZSM-23 (J. Chem. Soc. Chem. Comm. 1985 page 1117). In the above reference on ZSM-22 it was shown that ball-milling the crystallites produced a catalyst with a constraint index of 2.6. This is a surprisingly low value for this material given other studies which indicate that it is a very selective 10-ring pentasil (Proc. of 7th Intl. Zeolite Conf. Tokyo, 1986, page 23). Presumably the ballmilling leads to a less selective but more active catalyst, by virtue of producing smaller crystallites. So it is surprising here, that smaller crystallites maintain high selectivity in the case of SSZ-32X.

Typical sources of silicon oxide include silicates, silica hydrogel, silicic acid, colloidal silica, fumed silicas, tetraalkyl orthosilicates, and silica hydroxides. Salts, particularly alkali metal halides such as sodium chloride, can be added to or formed in the reaction mixture. They are disclosed in the literature as aiding the crystallization of zeolites while preventing silica occlusion in the lattice.

The reaction mixture is maintained at an elevated temperature until the crystals of the zeolite are formed. The temperatures during the hydrothermal crystallization step are typically maintained from about 140° C. to about 200° C., preferably from about 160° C. to about 180° C. and most preferably from about 170. degree. C. to about 180° C. The crystallization period is typically greater than 1 day and preferably from about 4 days to about 10 days.

The hydrothermal crystallization is conducted under pressure and usually in an autoclave so that the reaction mixture is subject to autogenous pressure, The reaction mixture can be stirred while components are added as well as during crystallization.

Once the zeolite crystals have formed, the solid product is separated from the reaction mixture by standard mechanical separation techniques such as filtration or centrifugation. The crystals are water-washed and then dried, e.g., at 90° C. to 150° C. for from 8 to 24 hours, to obtain the as-synthesized zeolite crystals. The drying step can be performed at atmospheric or subatmospheric pressures.

During the hydrothermal crystallization step, the crystals can be allowed to nucleate spontaneously from the reaction mixture. The reaction mixture can also be seeded with SSZ-32 crystals both to direct, and accelerate the crystallization, as well as to minimize the formation of undesired aluminosilicate contaminants.

SSZ-32X can be used as-synthesized or can be thermally treated (calcined). Usually, it is desirable to remove the alkali metal cation by ion exchange and replace it with hydrogen, ammonium, or any desired metal ion. The zeolite can be leached with chelating agents, e.g., EDTA or dilute acid solutions, to increase the silica alumina mole ratio. SSZ-32X can also be steamed. Steaming helps stabilize the crystalline lattice to attack from acids.

SSZ-32X can be used in intimate combination with hydrogenating components for those applications in which a hydrogenation-dehydrogenation function is desired. Typical replacing components can include hydrogen, ammonium, metal cations, e.g. rare earth, Group IIA and Group VII metals, as well as their mixtures. Preferred hydrogenation components include tungsten, vanadium, molybdenum, rhenium, nickel, cobalt, chromium, manganese, platinum, palladium (or other noble metals).

Metals added to affect the overall functioning of the catalyst (including enhancement of isomerization and reduction of cracking activity) include magnesium, lanthanum (and other rare earth metals), barium, sodium, praseodymium, strontium, potassium and neodymium. Other metals that might also be employed to modify catalyst activity include zinc, cadmium, titanium, aluminum, tin, and iron.

Hydrogen, ammonium as well as metal components can be exchanged into SSZ-32X. The zeolite can also be impregnated with the metals, or, the metals can be physically intimately admixed with SSZ-32X using standard methods known to the art. And, the metals can be occluded in the crystal lattice by having the desired metals present as ions in the reaction mixture from which the SSZ-32 zeolite is prepared.

Typical ion exchange techniques involve contacting the SSZ-32X with a solution containing a salt of the desired replacing cation or cations. Although a wide variety of salts can be employed, chlorides and other halides, nitrates, and sulfates are particularly preferred. Representative ion exchange techniques are disclosed in a wide variety of patents including U.S. Pat. Nos. 3,140,249; 3,140,251; and 3,140,253. Ion exchange can take place either before or after SSZ-32X is calcined.

Following contact with the salt, solution of the desired replacing cation, SSZ-32X is typically washed with water and dried at temperatures ranging from 65° C. to about 315° C. After washing, SSZ-32X can be calcined in air or inert gas at temperatures ranging from about 200° C. to 820° C. for periods of time ranging from 1 to 48 hours, or more, to produce a catalytically active product especially useful in hydrocarbon conversion processes.

The SSZ-32X zeolite described above is converted to its acidic form and then is mixed with a refractory inorganic oxide carrier precursor and an aqueous solution to form a mixture. The aqueous solution is preferably acidic. The solution acts as a peptizing agent. The carrier (also known as a matrix or binder) may be chosen for being resistant to the temperatures and other conditions employed in organic conversion processes. Such matrix materials include active and inactive materials and synthetic or naturally occurring zeolites as well as inorganic materials such as clays, silica and metal oxides. The latter may occur naturally or may be in the form of gelatinous precipitates, sols, or gels, including mixtures of silica and metal oxides. Use of an active material in conjunction with the synthetic SSZ-32X i.e., combined with it, tends to improve the conversion and selectivity of the catalyst in certain organic conversion processes.

SSZ-32X is commonly composited with porous matrix materials and mixtures of matrix materials such as silica, alumina, titania, magnesia, silica-alumina, silica-magnesia, silica-zirconia, silica-thoria, silica-beryllia, silica-titania, titania-zirconia as well as ternary compositions such as silica-alumina-thoria, silica-alumina-zirconia, silica-alumina-magnesia and silica-magnesia-zirconia. The matrix can be in the form of a cogel. In the instant invention, the preferred matrix materials are alumina and silica. It is possible to add metals for the enhancement of catalytic performance, during the actual synthesis of SSZ-32X, as well as during later steps in catalyst preparation. Methods of preparation include solid state ion exchange which is achieved by thermal means, spray drying with a metal salt solution, and preparation of a slurry in a salt solution. The slurry may be filtered to retrieve the SSZ-32X, now loaded with metal Inactive materials can suitably serve as diluents to control the amount of conversion in a given process so that products can be obtained economically without using other means for controlling the rate of reaction. Frequently, zeolite materials have been incorporated into naturally occurring clays, e.g., bentonite and kaolin. These materials e.g. clays, oxides, etc., function, in part, as binders for the catalyst. It is desirable to provide a catalyst having good crush strength, because in petroleum refining the catalyst is often subjected to rough handling. This tends to break the catalyst down into powders which cause problems in processing.

Naturally occurring clays which can be composited with the synthetic SSZ-32X of this invention include the montmorillonite and kaolin families, which families include the sub-bentonites and the kaolins commonly known as Dixie, McNamee, Georgia and Florida clays or others in which the main mineral constituent is halloysite, kaolinite, dickite, nacrite, or anauxite. Fibrous clays such as sepiolite and attapulgite can also be used as supports. Such clays can be used in the raw state as originally mined or can be initially subjected to calcination, acid treatment or chemical modification.

The mixture of SSZ-32X and binder can be formed into a wide variety of physical shapes. Generally speaking, the mixture can be in the form of a powder, a granule, or a molded product, such as an extrudate having a particle size sufficient to pass through a 2.5-mesh (Tyler) screen and be retained on a 48-mesh (Tyler) screen. In cases where the catalyst is molded such as by extrusion with an organic binder, the mixture can be extruded before drying, or dried or partially dried and then extruded. SSZ-32X can also be steamed. Steaming helps stabilize the crystalline lattice, to attack from acids. The dried extrudate is then thermally treated, using calcination procedures.

Calcination temperature may range from 390 to 1100° F. Calcination may occur for periods of time ranging from 0.5 to 5 hours, or more, to produce a catalytically active product especially useful in hydrocarbon conversion processes.

The extrudate or particle may then be further loaded using a technique such as impregnation, with a Group VIII metal to enhance the hydrogenation function. It may be desirable to coimpregnate a modifying metal and Group VIII metal at once, as disclosed in U.S. Pat. No. 4,094,821. The Group VIII metal is preferably platinum, palladium or a mixture of the two. After loading, the material can be calcined in air or inert gas at temperatures from 500 to 900° F.

Feeds

The instant invention may be used to dewax a variety of feedstocks ranging from relatively light distillate fractions such as kerosene and jet fuel up to high boiling stocks such as whole crude petroleum, reduced crudes, vacuum tower residua, cycle oils, synthetic crudes (e.g., shale oils, tars and oil, etc.), gas oils, vacuum gas oils, foots oils, Fischer-Tropsch derived waxes, and other heavy oils. Straight chain n-paraffins either alone or with only slightly branched chain paraffins having 16 or more carbon atoms are sometimes referred to herein as waxes. The feedstock will often be a C10+ feedstock generally boiling above about 350° F. since lighter oils will usually be free of significant quantities of waxy components. However, the process is particularly useful with waxy distillate stocks such as middle distillate stocks including gas oils, kerosenes, and jet fuels, lubricating oil stocks, heating oils and other distillate fractions whose pour point and viscosity need to be maintained within certain specification limits. Lubricating oil stocks will generally boil above 230° C. (450° F.), more usually above 315° C. (600° F.). Hydroprocessed stocks are a convenient source of stocks of this kind and also of other distillate fractions since they normally contain significant amounts of waxy n-paraffins. The feedstock of the present process will normally be a C10+ feedstock containing paraffins, olefins, naphthenes, aromatic and heterocyclic compounds and with a substantial proportion of higher molecular weight n-paraffins and slightly branched paraffins which contribute to the waxy nature of the feedstock. During the processing, the n-paraffins and the slightly branched paraffins undergo some cracking or hydrocracking to form liquid range materials which contribute to a low viscosity product. The degree of cracking which occurs is, however, limited so that the yield of products having boiling points below that of the feedstock is reduced, thereby preserving the economic value of the feedstock.

Typical feedstocks include hydrotreated or hydrocracked gas oils, hydrotreated lube oil raffinates, brightstocks, lubricating oil stocks, synthetic oils, foots oils. Fischer-Tropsch synthesis oils, high pour point polyolefins, normal alphaolefin waxes, slack waxes, deoiled waxes and microcrystalline waxes.

Conditions

The conditions under which the isomerization/dewaxing process of the present invention is carried out generally include a temperature which falls within a range from about 392° F. to about 800° F., and a pressure from about 15 to about 3000 psig. More preferably the pressure is from about 100 to about 2500 psig. The liquid hourly space velocity during contacting is generally from about 0.1 to about 20, more preferably from about 0.1 to about 5. The contacting is preferably carried out in the presence of hydrogen. The hydrogen to hydrocarbon ratio preferably falls within a range from about 2000 to about 10,000 standard cubic feet $H_2$ per barrel hydrocarbon, more preferably from about 2500 to about 5000 standard cubic feet $H_2$ per barrel hydrocarbon.

The product of the present invention may be further treated as by hydrofinishing. The hydrofinishing can be conventionally carried out in the presence of a metallic hydrogenation catalyst, for example, platinum on alumina. The hydrofinishing can be carried out at a temperature of from about 374° F. to about 644° F. and a pressure of from about 400 psig to about 3000 psig. Hydrofinishing in this manner is described in, for example, U.S. Pat. No. 3,852,207 which is incorporated herein by reference.

EXAMPLES

The synthesis of a broadline zeolite (in reference to the x-ray diffraction pattern) SSZ-32X is really synonymous with crystallizing a very small crystal example of the zeolite. The x-ray diffraction pattern broadens as the crystallites are reduced in size. In general, for the system of MTT structure zeolites, of which standard SSZ-32 as well as SSZ-32X are examples, as the $S_iO_2/Al_2O_3$ ratio diminishes (greater wt % Al in the zeolite product) the crystallite size also diminishes.

FIG. 1(a) compares the SSZ-32X peak occurrence and relative intensity with that of standard SSZ-32. Relative intensity is obtained when an intensity value is divided by a reference intensity and multiplied by 100%, or 100×I/Io.

Figure 1B:
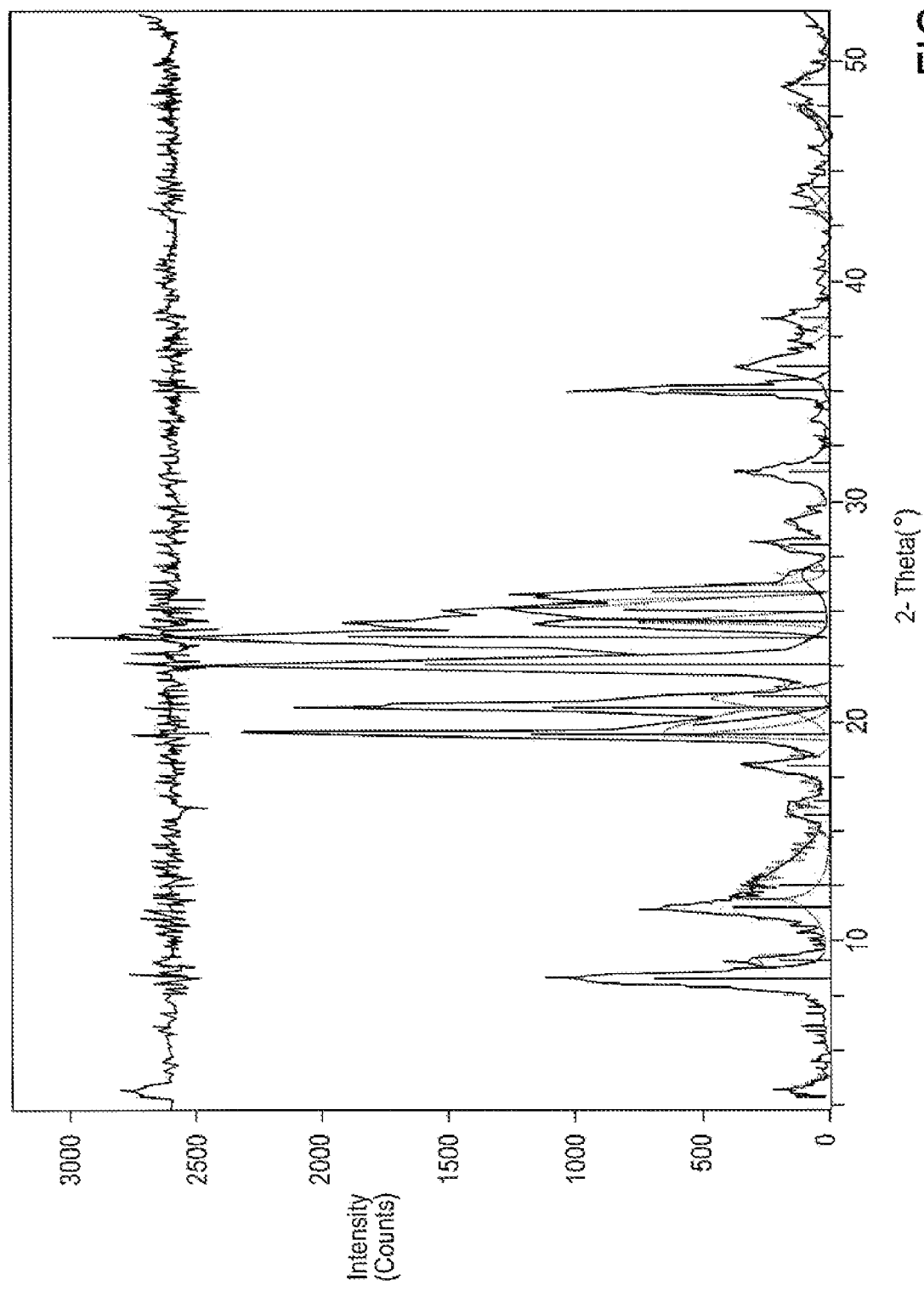
Figure 1C:
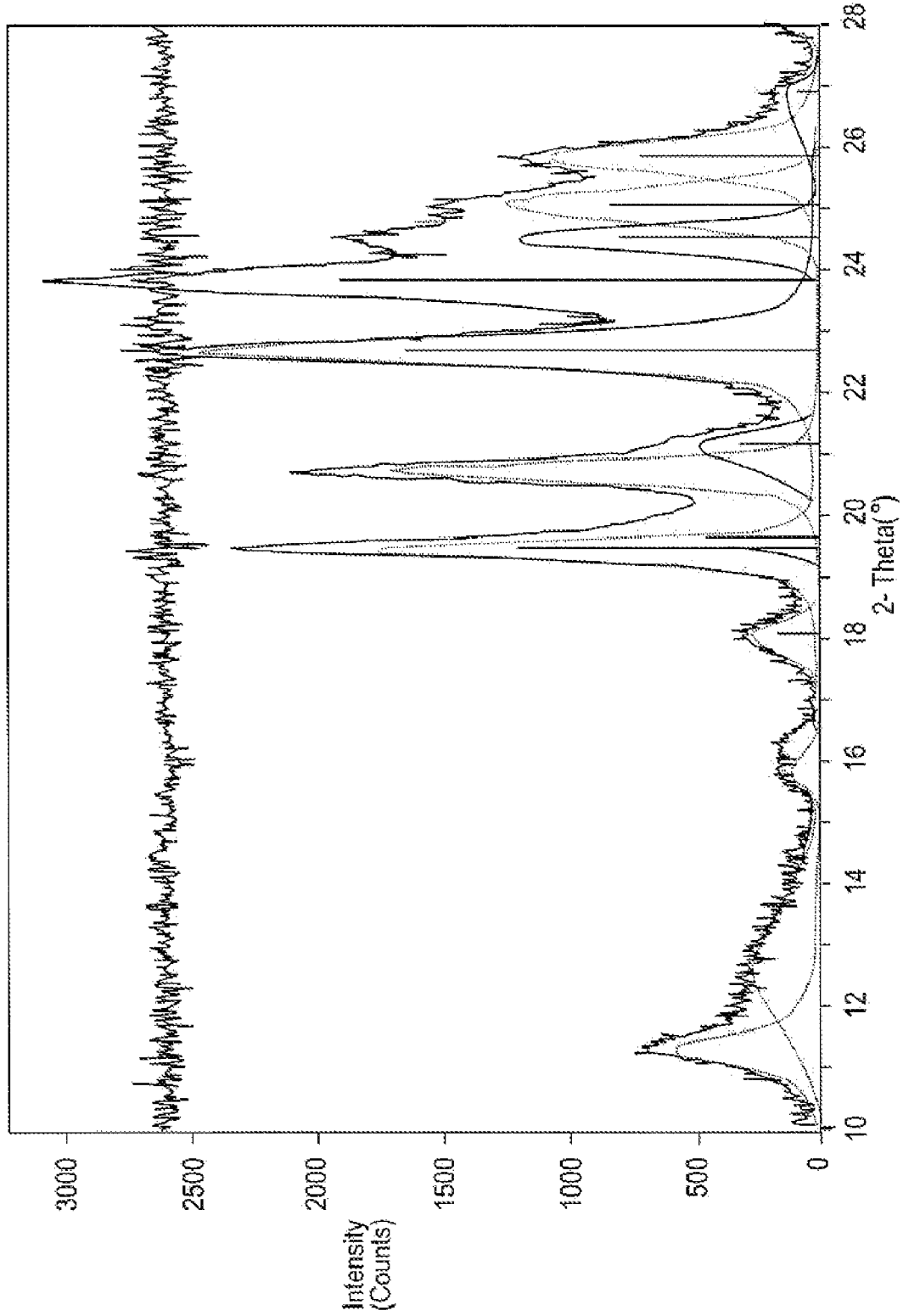

FIGS. 1(b) and (c) superimpose the SSZ-32X plot on the standard SSZ-32 plot, clearly showing the match up of major peaks. FIG. 1(c) shows a more detailed portion of FIG. 1(b). Table 2(a) shows the peak listing and relative intensity of peaks of standard SSZ-32. Table 2(b) magnifies peak width so that major peaks of SSZ-32X and standard SSZ-32 tray be easily compared.

TABLE 2(a)

Peak listing of standard SSZ-32

| 2 Theta | d-spacing (Å) | Relative Intensity (%) (I/Io) × 100 |
|---|---|---|
| 7.9 | 11.2 | 19 |
| 8.2 | 10.8 | 24 |
| 8.9 | 10.0 | 11 |
| 11.4 | 7.8 | 20 |
| 14.7 | 6.05 | 2 |
| 15.9 | 5.59 | 5 |
| 11.4 | 5.41 | 4 |
| 18.2 | 4.88 | 12 |
| 19.6 | 4.52 | 69 |
| 20.1 | 4.43 | 11 |

TABLE 2(a)-continued

Peak listing of standard SSZ-32

| 2 Theta | d-spacing (Å) | Relative Intensity (%) (I/Io) × 100 |
|---|---|---|
| 20.9 | 4.25 | 70 |
| 21.4 | 4.15 | 9 |
| 22.8 | 3.90 | 100 |
| 23.9 | 3.73 | 53 |
| 24.0 | 3.70 | 58 |
| 24.7 | 3.61 | 50 |
| 25.2 | 3.53 | 36 |
| 26.0 | 3.43 | 42 |
| 28.2 | 3.16 | 11 |
| 29.4 | 3.03 | 7 |
| 31.6 | 2.83 | 13 |

TABLE 2(b)

Peaks in as-made SSZ-32X

| 2 Theta | d-spacing (Å) | Relative Intensity (%) (I/Io × 100) |
|---|---|---|
| 8.03 | 11.0 | 33 |
| 8.83 | 10.0 | 6 |
| 11.30 | 7.83 | 20 |
| 15.71 | 5.64 | 3 |
| 16.34 | 5.42 | 3 |
| 18.09 | 4.90 | 7 |
| 19.54 | 4.54 | 33 |
| 19.67 | 4.51 | 20 |
| 20.81 | 4.27 | 31 |
| 21.21 | 4.18 | 14 |
| 22.74 | 3.91 | 63 |
| 23.91 | 3.72 | 100 |
| 24.54 | 3.62 | 24 |
| 25.09 | 3.55 | 34 |
| 25.87 | 3.44 | 31 |
| 26.91 | 3.31 | 5 |
| 28.10 | 3.17 | 4 |
| 29.34 | 3.04 | 5 |
| 31.46 | 2.84 | 8 |
| 31.94 | 2.80 | 3 |
| 34.02 | 2.63 | 1 |
| 35.22 | 2.55 | 17 |
| 36.29 | 2.47 | 16 |

Example 1

Synthesis of SSZ-32X

A preparation of the desired material was synthesized as follows: A Hastelloy C liner for a 5 gallon autoclave unit was used for the mixing of reagents and then in the subsequent thermal treatment. At a rate of 1500 RPM and for a period of ½ hour, the following components were mixed once they had been added in the order of description. 300 grams of a 1 Molar solution of N,N' Diisopropyl imidazolium hydroxide was mixed into 4500 grams of water. The salt iodide was prepared as in U.S. Pat. No. 4,483,835, Example 8, and then subsequently was ion-exchanged to the hydroxide form using BioRad AG1-X8 exchange resin. 2400 grams of 1 N KOH were added, 1524 grams of Ludox AS-30 (30 wt % $S_iO_2$) were added. 1080 grams of Nalco's 1056 colloid sol (26 wt % $S_iO_2$ and 4 wt % $Al_2O_3$) were added. Last, 181 grams of isobutylamine were stirred into the mixture. In general, the molar concentration of the amine $Q_b$ must exceed the molar concentration of the imidazolium compound, $Q_a$.

Once the stirring was finished the autoclave head was closed up and the reaction was taken up to 170° C. with an 8 hour ramp up time. The system was stirred at 150 RPM. The reaction was terminated so that a product was collected after 106 hours of heating. The solids were collected by filtration (which goes very slowly; an indication of small crystals). It was subsequently washed several times and then dried. The material was analyzed by x-ray diffraction and the pattern is shown in Table 3. A comparison is made with the more standard SSZ-32 data presented in Table 2(a) and it can be seen that the new product of Example 1 is essentially related to SSZ-32 but has the diffraction lines considerably broadened.

TABLE 3

| 2Θ | d-spacing (Å) | Intensity | Relative Intensity (%) (I/Io × 100) |
|---|---|---|---|
| 8.00 | 11.05 | 15 | 26 |
| 8.80 | 10.05 | 6 | 10 |
| 11.30 | 7.83 | 10 | 17 |
| 14.50 | 6.11 | 1 | 2 |
| 15.75 | 5.63 | 3 | 5 |
| 16.50 | 5.37 | 3 | 5 |
| 18.10 | 4.901 | 7 | 12 |
| 19.53 | 4.545 | 41 | 71 |
| 20.05 | 4.428 | 6 shoulder | 10 shoulder |
| 20.77 | 4.277 | 41 | 71 |
| 21.30 | 4.171 | 7 | 12 |
| 22.71 | 3.915 | 58 | 100 |
| 23.88 | 3.726 | 57 | 98 |
| 24.57 | 3.623 | 30 | 52 |
| 25.08 | 3.551 | 25 | 43 |
| 25.88 | 3.443 | 27 | 47 |
| 26.88 | 3.317 | 5 | 9 |
| 28.11 | 3.174 | 6 | 10 |

In a concern that the product might be a mix of small crystals and considerable amorphous material, a TEM (Transmission Electron Microscopy) analysis was carried out. The microscopy work demonstrated that the product Example 1 was quite uniformly small crystals of SSZ-32 (the product was a SSZ-32X) with very little evidence of amorphous material. The crystallites were characterized by a spread of small, broad lathe-like components in the range of 200-400 Angstroms. The $SiO_2/Al_2O_3$ ratio of this product was 29.

Example 2

The product of Example 1 was calcined to 1100° F. in air with a ramp of 1 deg. C/min (1.8 F/min) and plateaus of 250° F. for 3 hours, 1000 F for 3 hours and then 1100° F. for 3 hours. The calcined material retained its x-ray crystallinity. The calcined zeolite was subjected to 2 ion-exchanges at 200° F (using $NH_4NO_3$) as has been previously described in U.S. Pat. No. 5,252,527. The ion-exchanged material was recalcined and then the microporosity measurements were explored, using a test procedure also described in U.S. Pat. No. 5,252,527. The new product, SSZ-32X, had some unexpected differences vs. conventional SSZ-32.

The Ar adsorption ratio for SSZ-32X (Ar adsorption at 87K between the relative pressures of 0.001 and 0.1)/(total Ar adsorption up to relative pressure of 0.1) is larger than 0.5 and preferably in the range of 0.55 to 0.70. In contrast for the conventional SSZ-32, the Ar adsorption ratio is less than 0.5, typically between 0.35 and 0.45. The SSZ-32X of Examples 1 and 2 demonstrates an Argon absorption fraction of 0.62. The external surface area of the crystallites jumped from about 50 $m^2/g$ (SSZ-32) to 150 (SSZ-32X), indicating the considerable external surface as a result of very small crystals.

At the same time, the micropore volume for SSZ-32X had dropped to about 0.035 cc/gm, as compared with about 0.06 cc/gm for standard SSZ-32.

Example 3

The ion-exchanged SSZ-32X was tested for cracking activity via the use of the Constraint Index test. This test was an important parameter in showing the unique selectivity of zeolite SSZ-32X. The test is described in U.S. Pat. No. 5,252,527, Example 9. Using the test conditions, standard SSZ-32 typically provides a Constraint Index of 13-22 at 50% conversion and 800 F. The product of Example 2 of the instant application, when run under the same procedures yields a much lower conversion of about 12% while maintaining shape-selective behavior.

TABLE 4

Characteristics
Comparison between standard SSZ-32 and SSZ-32X

|  | Standard SSZ-32 | SSZ-32X |
|---|---|---|
| Diisopropylimidazolium/silica | 0.00 | 0.05 |
| Product Silica/alumina ratio | 35 | 28-30 |
| Product Ar adsorption fraction* | (0.35-0.45) | (0.55-0.70) |
| Constraint index conversion Test | 50% | 12% |
| Crystal size, microns | 0.17 | 0.01-0.04 |

*Ar adsorption at 87k between the relative pressures of 0.001 and 0.1)/(total Ar adsorption up to the relative pressure of 0.1)

Example 4

The next surprise concerning this material came from the testing of isomerization capability using n-hexadecane as feed and Pd metal on the product from Example 2 of the instant invention. Pd ion-exchange was carried out as was previously described in U.S. Pat. No. 5,282,958, Example 1. The catalyst was tested using the procedure described in U.S. Pat. No. 5,282,958, Example 1. Both the new catalyst and a standard SSZ-32 powder at comparable $SiO_2/Al_2O_3$ gave about 96% conversion of n-$C_{16}$ at 545° F. The difference is that the new material of Example 2 of the instant invention gave an isomerization selectivity of 75.8% vs. a value of 64% for standard SSZ-32, as disclosed in U.S. Pat. No. 5,282,958, Example 1. So even though the zeolite was shown to have considerably less cracking activity in Example 3, the activity for hydroconversion equals that of the standard SSZ-32 and the selectivity is considerably better. One of the main distinctions between the catalysts was that the standard SSZ-32 produces about 13% material which is $C_6$ and lower, and the new zeolite reduces that number to 7%. Liquid yield is increased and light end production is reduced.

Example 5

The catalyst of Example 4 was made, in this instance with Pt rather than Pd. Calcination of the Pt catalyst was at 550° F. for 3 hours. 8 cc of catalyst chips (24-42 mesh size) were measured out and packed into a stainless steel reactor after drying overnight in air at 500° F. The catalyst was then reduced at 500° F. in flowing $H_2$ at 2300 psig for 1 hour. After reduction of the metal, the catalyst was used to isomerize a waxy light neutral hydrocrackate feed, API 38.9, having a 33% wax content, and a pour point of 38° C. The whole liquid product from the reactor was split in a stripper into two fractions. The bottoms product target was a −15° C. pour point. A standard SSZ-32 catalyst was also prepared and treated in an analogous manner. The data in Table 5 below shows the improvement which is gained upon using the new SSZ-32X as an isomerization catalyst. Once again a main advantage seems to be reduced light gas production, which may be related to the lower overall intrinsic acidity of this new material.

TABLE 5

| Zeolite | Wt % 700+ | Product VI At 4.1 CSt | C1-C4, wt % | C5-250° F. | 250-550° F. |
|---|---|---|---|---|---|
| Std SSZ-32 | 70.2 | 127 | 5.2 | 9.3 | 10 |
| SSZ-32X | 75.4 | 129 | 2.4 | 6 | 8.3 |

Example 6

Figure 2A:
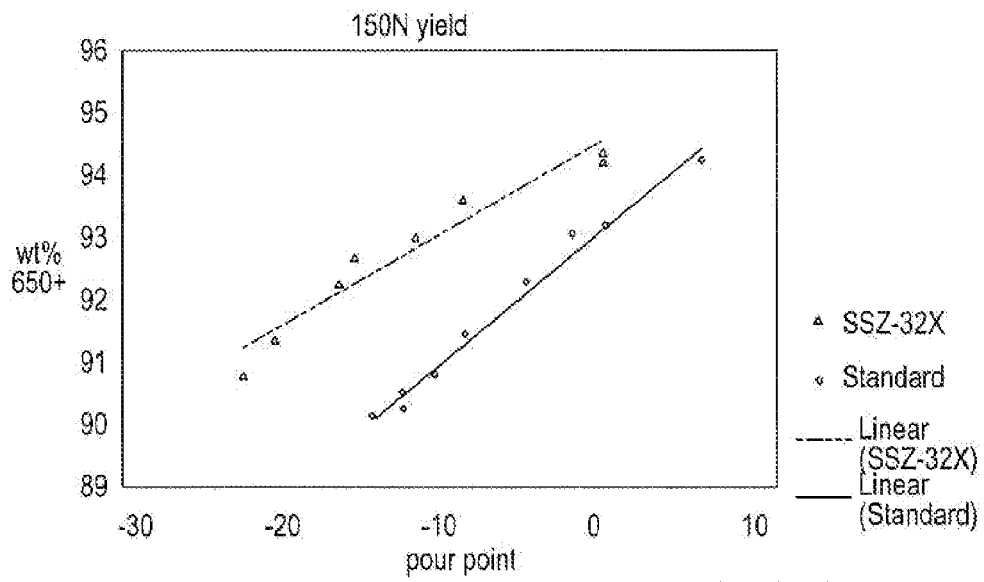
FIGS. 2(a) and 2(b) illustrate a comparison of yield and VI characteristics for use of SSZ-32X in Isodewaxing, compared with that of standard SSZ-32.
Figure 2B:
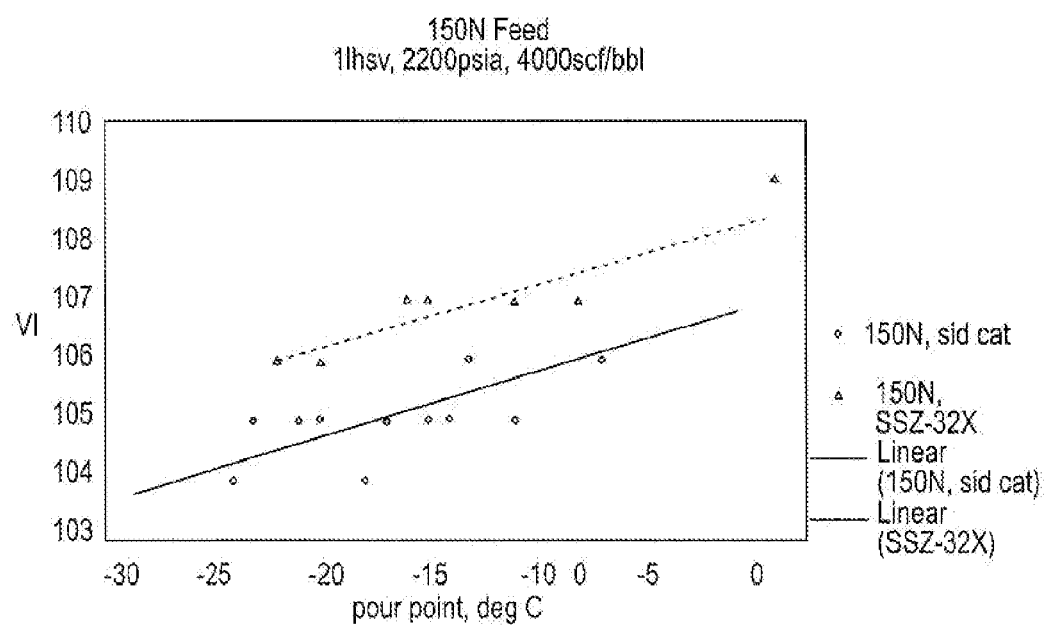

A bound catalyst was made using the SSZ-32X zeolite powder, using alumina binder, extrusion, base drying and calcination, incipient wetness Pt impregnation and final drying and calcining of the extrudate. The overall Pt loading was 0.32 wt. %. After following loading and activation procedures similar to the last example, a titration step was performed by adding 200 micromoles nitrogen (as tributyl amine) per gm catalyst. This catalyst was then tested on a waxy 150N hydrocrackate feed containing 10% wax and a pour point of +32° C. Process conditions used were a LHSV of 1.0 hr −1, 4000 scf/bbl gas to oil ratio and a total pressure of 2300 psig. In FIGS. 2(a) and 2(b) the observed yield and VI obtained when a bottoms product (650° F.+cut) is contacted with a catalyst comprising SSZ-32X are compared to results obtained when the feed is contacted with a similar bound catalyst made from standard SSZ-Z32 zeolite. An improved yield and VI over the range of −5 to −25° C. product pour point is shown.

What is claimed is:

1. The process for dewaxing a hydrocarbon feed thereby producing a maximized yield of isomerized product and a minimized yield of light ends, the feed including straight chain and slightly branched paraffins having 10 or more carbon atoms, comprising contacting the feed under isomerization conditions in the presence of hydrogen with catalyst comprising an intermediate pore size molecular sieve which is prepared according to the following steps:
  (a) synthesizing a zeolite having a mole ratio of silicon oxide to aluminum oxide greater than greater than about 20:1 to less than 40:1, with crystallites having small broad lathe-like components in the range of 200-400 A, and having the x-ray diffraction lines of Table 2B by employing the following steps:
    (i) combining the followings reagents in the amounts specified to form a mixture:
      (1) 5 parts of an N-lower alkyl-N'-isopropyl-imidazolium cation which has been ion-exchanged to the hydroxide form;
      (2) 20 parts of an alkali metal hydroxide;
      (3) 100 parts of SiO2 to 3.5 parts of Al2O3;
      (4) 20 parts of an alkyl amine,
    (ii) stirring the mixture of step (i) in an autoclave, under autogenous pressure, in a range of from 500 to 1500 rpm for a period of 0.5 to 5 hours;
    (iii) maintaining the mixture at an elevated temperature for a period of from 40 to 120 hours to form the crystals of the zeolite;
    (iv) collecting the crystals of the zeolite by filtration or by centrifugation;
    (v) subjecting the crystals to calcination and ion exchange;
  (b) mixing the zeolite synthesized in stage (a) with a refractory inorganic oxide carrier precursor and an aqueous solution to form a mixture, the mixture having a molecular sieve content from about 10 to about 90 wt %;
  (c) extruding or forming the mixture from step (b) to form an extrudate or formed particle;
  (d) drying the extrudate or formed particle of step (c);
  (e) calcining the dried extrudate or formed particle of step (d);
  (f) loading of the extrudate or formed particle of step (d) with a hydrogenation component to prepare a catalyst precursor
  (g) drying the catalyst precursor of step (f);
  (h) calcining the dried catalyst precursor of step (f) to form a finished bound dewaxing catalyst.

2. The dewaxing process of claim 1, wherein the zeolite is SSZ-32X.

3. The dewaxing process of claim 2, employing a zeolite prepared from an aqueous solution having a composition, as synthesized and in the anhydrous state, in terms of mole ratios of oxides as follows: (0.05 to 2.0)Q2O:(0.1 to 2.0)M2 O: Al.2 O3 (20 to less than 40) SiO2 wherein M is an alkali metal cation, and Q is the sum of Qa an N-lower alkyl-N'-isopropylimidazolium cation, and Qb, an amine, the zeolite having the X-ray diffraction lines of Table 1, wherein the molar concentration of Qb is greater than the molar concentration of Qa.

4. The process of claim 2, wherein Qa is selected from the group consisting of N-methyl-N'-isopropyl-imidazolium cation and N,N'-diisopropyl-imidazolium cation.

5. The process of claim 4, wherein the liquid hourly space velocity during contacting is from about 0.1 to about 20.

6. The process of claim 5, wherein the liquid hourly space velocity is from 0.5 to about 5.

7. The process of claim 2, wherein Qb is selected from the group consisting of isopropyl, isobutyl, isopentyl, neopentyl or monoethyl amine.

8. The process of claim 2, wherein the zeolite has a constraint index in the range from 8 to 30.

9. The process of claim 2, wherein the zeolite has a silica/alumina ratio in the range from 20 to 40.

10. The process of claim 2, wherein the zeolite is prepared by thermal treating at a temperature of from 200° C. (392° F.) to 820° C. (1508° F.).

11. The process of claim 2, wherein the zeolite is ion exchanged with hydrogen, ammonium, rare earth metal, Group IIA metal or Group VIII metal ions.

12. The process of claim 2, wherein rare earth metals, Group IIA metals, or Group VIII metals are occluded in the zeolite.

13. The process of claim 12, wherein Group VIII metals are selected from the Group consisting of platinum and palladium, and/or mixtures thereof.

14. The process of claim 2, wherein said feed is selected from the group consisting of hydrotreated or hydrocracked gas oils, hydrotreated lube oil raffinates, brightstocks, lubricating oil stocks, synthetic oils, foots oils, Fischer-Tropsch synthesis oils, high pour point polyolefins, normal alphaolefin waxes, stack waxes, deoiled waxes and microcrystalline waxes.

15. The process of claim 2 wherein said contacting is carried out at a temperature of from 450-800° F., and a pressure in the range from about 15 psig to about 3000 psig.

16. The process of claim 15, wherein said pressure is in the range from about 100 psig to about 2500 psig.

17. The process of claim 2, wherein the hydrocarbon feed is hydrotreated prior to isomerization at a temperature in the range from 325 to 800° F.

18. The process of claim 2, further comprising a hydrofinishing step following isomerization.

19. The process of claim 18, further comprising hydrofinishing of isomerized product.

20. The process of claim 19, wherein hydrofinishing is carried out at a temperature in the range from about 325 to about 590° F. and a pressure in the range from about 400 psig to about 3000 psig.

* * * * *